US008210541B2

(12) United States Patent
Takahashi

(10) Patent No.: US 8,210,541 B2
(45) Date of Patent: Jul. 3, 2012

(54) MECHANICAL SEAL DEVICE

(75) Inventor: Hidekazu Takahashi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 337 days.

(21) Appl. No.: 12/594,783

(22) PCT Filed: Apr. 3, 2008

(86) PCT No.: PCT/JP2008/056688
§ 371 (c)(1),
(2), (4) Date: Oct. 5, 2009

(87) PCT Pub. No.: WO2008/132958
PCT Pub. Date: Nov. 6, 2008

(65) Prior Publication Data
US 2010/0117303 A1 May 13, 2010

(30) Foreign Application Priority Data
Apr. 12, 2007 (JP) ................................. 2007-105188

(51) Int. Cl.
*F16J 15/38* (2006.01)
*F16J 15/34* (2006.01)
(52) U.S. Cl. ........................................ 277/390; 277/408
(58) Field of Classification Search .................. 277/370, 277/371, 390, 392, 393, 397, 408
See application file for complete search history.

(56) References Cited

U.S. PATENT DOCUMENTS

| 5,577,738 | A |   | 11/1996 | Fukuda |         |
|-----------|---|---|---------|--------|---------|
| 5,676,382 | A | * | 10/1997 | Dahlheimer | 277/320 |
| 5,893,564 | A | * | 4/1999  | Yang | 277/374 |
| 6,814,355 | B2 | * | 11/2004 | Bjornson | 277/358 |
| 6,932,348 | B2 | * | 8/2005  | Takahashi | 277/359 |
| 6,962,340 | B2 | * | 11/2005 | Maruyama | 277/370 |
| 7,311,307 | B2 | * | 12/2007 | Dahlheimer | 277/373 |
| 2003/0042683 | A1 | * | 3/2003 | Takahashi | 277/370 |
| 2008/0093806 | A1 | * | 4/2008 | Takahashi | 277/375 |
| 2009/0085300 | A1 |   | 4/2009 | Takahashi | |

FOREIGN PATENT DOCUMENTS

| JP | 04-105671 U | 9/1992 |
| JP | 05-083544 U | 11/1993 |
| WO | WO 8908798 A1 * | 9/1989 |
| WO | WO 2006/022378 * | 3/2006 |
| WO | WO 2006/137305 A1 | 12/2006 |

* cited by examiner

*Primary Examiner* — Thomas Beach
*Assistant Examiner* — Nicholas L Foster
(74) *Attorney, Agent, or Firm* — Arent Fox LLP

(57) ABSTRACT

A mechanical seal device comprises an attachment component (30) made of resin material having a mounting face (30A) attached with an outer face (60A) of a casing body (60), a fitting face (30C), a ring shape groove face (30B) and a shutoff face (30S) which are formed on an inner circumferential face, and a cooling fluid passage (40) communicating with a cooling chamber (R3) in said ring shape groove face (30B). The mechanical seal device further comprises a first seal ring (3) made of a rustless material having a seal face (3A), a second seal ring (10) made of a rustless material having a counter seal face (10A) slidable in closely contact with the seal face (3A), a seal collar (50) made of resin material holding said second seal ring (10) hermetically, and a seal ring (20) having a third seal face (20B1) which closely contacts with said shutoff face (30S). The seal ring (20) is sandwiched between said supporting circumferential face (50A) and a circumferential section (10B) of the second seal ring (10).

3 Claims, 3 Drawing Sheets

MECHANICAL SEAL DEVICE

TECHNICAL FIELD

The present invention relates to a mechanical seal device. In particular, a cartridge type mechanical seal device which is appropriate to seal a sealed fluid such as chemical liquid, corrosive liquid and a sealed fluid having high viscosity, for example, to prevent reducing capability due to adhesion of the sealed fluid to a sliding portion, further, to prevent corrosion by the chemical liquid, etc.

BACKGROUND ART

A mechanical seal device is used for a chemical device, for example, a device using chemical liquid to cause corrosion of metal, or is used for shaft sealing of devices which treat process fluid for petroleum processing, for petrochemical, for pulp and paper, it is necessary to prevent reducing performance due corrosion of components of the mechanical seal device or adhering with the components. Also, a technology which is available to mount the mechanical seal easily, easily assembling, disassembling and inspection is required. Further, the mechanical seal device having reduced manufacturing cost is required. Further, when sealing sealed fluid such as oil and chemical liquid having large viscosity, a technology is required to prevent reducing sealing capability of seal face of a sealing ring due to solidification of the sealed fluid to a device. In recent years, a technology is required to simplify constitution of the mechanical seal device due to such technical background, for preventing functional depression of a sliding face as well as preventing corrosion of components.

Therefore, with respect to prior arts according to the present invention, there is a mechanical seal device which is shown in FIG. 3 (refer to Patent Document 1). FIG. 3 is a whole cross sectional view of a mechanical seal device 100 attached to a casing 160. This mechanical seal device 100 can be used as a shaft seal device for activating chemical liquid, etc.

Firstly, a constitution of this mechanical seal device 100 will be specified simply. In FIG. 3, the mechanical seal 100 seals a betweenness of the casing 160 and a rotary shaft 150 provided in a bore peripheral surface 160A (also referred as inboard "A") of the casing 160. Also, the mechanical seal device 100 is made as a cartridge type which is mounted to a tip end face 160B of the casing 160, for easily mounting. In this mechanical seal device 100, a fixed seal ring 102 (also, referred as movable seal ring) provided in the bore peripheral surface 160A of the casing 160 and a rotary seal ring 112. Further, a case body 130 for maintaining the fixed seal ring 102 and a supporting body 106 to which the fixed seal ring 102 is equipped at outboard B of the casing 160, and a sleeve 125 for rotatably maintaining the rotary seal ring 112 at an inner side of the bore peripheral face 160A are main constitutional components of the mechanical seal device 100.

This rotary seal ring 112 is, in order to be provided in a space shown by a length L of the inboard "A" in the bore peripheral face 160A of the casing and a space D of a radial direction, fit with an inner circumferential face 125C of a long sleeve 125 to the rotary shaft 150 and is equipped with a connection component 126 which connects with one end portion of the inboard "A" side. Then, another end portion of the outboard side "B" side of the sleeve 125 is connected with a supporting portion 127 and fixing the sleeve 125 and the rotary shaft 150 by threading a screw socket 128 to a screw portion provided on the supporting portion 127. each of fitting spaces between the sleeve 125 fit with the rotary shaft 150 and a connection component 126 fit with the sleeve 125 are sealed by O-rings for sealing arranged on mounting grooves provided on the sleeve 125. Also, the sleeve 125 and the connection component 126 are connected via a drive pin 129. Further, the connection component 126 and the rotary seal ring 112 are connected by locking with a drive pin and a groove having U-shape (also referred as notch) of an axial direction without numerical references within respective mating. Further, this mating space is sealed by an O-ring 141 provided between the connection component 126 and the rotary seal ring 122.

On the other hand, the fixed seal ring 102 is maintained by fitting with a stepped face 106D at an inner circumferential face 106C provided at one end portion of the supporting body 106 which is a cylindrical shape. Also, the supporting body 106 is unrotatably supported with the case body 130 by fitting of a fixing pin 137 which is provided on the case body 130 and a groove 106G, and movably fits toward the axial direction. A fitting space between the supporting body 106 and the case body 130 is sealed by an O-ring 143 arranged between a first stepped face 106A of the supporting body 106 and a second stepped face 130A of the case body 130. Then, a ring shape spring receiving section is fitted to a groove of another end portion of the supporting body 106.

The case body 130 joints an end portion 130F to a tip end face 160B of the casing 160, and fixes to the casing 160 with fastening a nut 128A to a stud bolt which is coupled with the casing 160. A stepped face is provided at an inner circumferential side of a side face of the case body 130. A spring seat 107 is attached to the stepped face by a lock screw section. Also, a spring 120 supported at the spring seat 107 is provided between a spring receiving section to bias the fixed seal shaft 102 elastically by a spring 120 with the spring receiving section and the supporting body 106. A sealing face 102 of the fixed seal ring 102 biased by the spring 120 seals sealed fluid which exits at an outer circumferential side by hermetically contact with a counter seal face 112F of the rotary seal ring 112. Also, a mounting groove having ring shape is provided at an inner circumference of the spring seat 107. A spirally wounded gasket 146 is provided at the mounting groove. A seal face of the gasket 146 closely contacts with an outer circumferential face of the sleeve 126 so as to seal leakage of a quenching fluid to the outboard B.

Also, for cooling a sliding of the rotary seal ring 112 and the fixed seal ring 102, a flushing path 136 is provided at the case body 130 which communicates through an outer circumferential face 126B of the connection component 126 to which the rotary seal ring 112 is equipped and a flashing passage of an outside of an outer circumferential face 1068 of the supporting body 106 to which the fixed seal ring 102 is equipped. A quenching passage 135 which communicates with an inner circumferential face 106 of the supporting body 106, an inner circumferential face of the fixed seal ring 102 and a cooling passage S at an inside of an inner circumferential face of the rotary seal ring 112. Then a flushing fluid which flow outs from the flushing passage 136 flows into the cooling passage S to cool the rotary seal ring 112 and the fixed seal ring 102.

In the mechanical seal device 100 constituted in this manner, because it is necessary to provide the fixed seal ring 102 and the rotary seal ring 112 at a position which contact with process fluid such as chemical, etc., at the inboard "A" side of the bore peripheral surface 160A in the casing 160, the supporting body 106, the connection component 126 and the sleeve 125 which are metal corrode by the process fluid. Also, it is necessary to wash an outer peripheral side of the rotary seal ring 112 and the fixed seal ring 102 by providing a flushing passage 136 at the case body 130. This flushing fluid shall be the same with the process fluid, it will fear of adverse effect because it will be mixed into the process fluid. Therefore, it is necessary to pressure sending a part of the process fluid to the flushing passage 136 by a pump, even in case of mixing into the process fluid. However, the pump and the case body 130 are corroded by the process fluid. Further, because it is necessary to provide the rotary seal ring 112 at the "A" side of the bore peripheral face 160A of the casing, the sleeve 125 to fix the rotary seal ring 112 will be necessary as well as it will be complicated structure because the connection component 126 have to be equipped.

Also, it is necessary to cool the rotary seal ring 112 and the fixed seal ring 102 by providing the quenching fluid at an inner circumferential side of the rotary seal ring 112 and the fixed seal ring 102. However, because the quenching fluid flows into an inner circumferential side of a seal face 102F of the fixed seal ring 102 and a counter seal face 112F of the rotary seal ring 112, there will be a risk of problem that the quenching fluid is mixed with different kinds of process fluid due to the quenching fluid such as pure water, etc. leaks outside by sliding movement as well as a centrifugal force when the seal face 102 and the counter seal face 112F slide relatively.

Further, as mentioned above, it is necessary to provide the supporting member 106 to the fixed seal ring 102. Simultaneously, it is necessary to provide the connection component 126 at the rotary seal ring 112. Therefore, the sleeve 126 becomes long length as a length "L" towards to the inboard "A" depth of the bore peripheral face 160A at the casing 160. As a result, because the flushing fluid flows through a narrow flushing passage at an outer circumferential face side of the rotary seal ring 112 and the fixed seal ring 102, the cleaning effect for flushing the rotary seal ring 112 and the fixed seal ring 102 is reduced. Also, similarly, an inner circumferential side of the rotary seal ring 102 and the fixed seal ring 112 is formed as a narrow cooling passage "S" and the quenching fluid flows through, a flow amount of the quenching fluid becomes small, thus a cooling effect for cooling the fixed seal ring 102 and the rotary seal ring 112 is reduced. Further, in case of a sealed fluid having high viscosity, due to adhering with a betweenness of the seal face 102F and the counter seal face 112F and a betweenness of the O-ring 143, the first stepped face 106A and the second stepped face 130A, there will be a risk of problem to reduce sealing capability of each of the seal faces 102F, 112F and the O-ring.

Patent Document 1: Japanese Patent Laid Open No. 11-13894

Patent Document 2: Japanese Utility Model Laid Open No. 2-94973

DISCLOSURE OF INVENTION

Problems to be Solved by the Invention

The present invention has been made upon considering above mentioned problems, and a technical problems to be solved by the invention is to prevent corrosion of functional components of a mechanical seal device by sealed fluid even though the sealed fluid such as chemical liquid, high viscosity liquid, etc. which causes corrosion of the components. Also, it aims to increase sealing capability of a seal face of a rotary seal ring and a counter seal face of a fixed seal ring due to preventing corrosion of the components which contact with the sealed fluid. Further, it aims to increase a response capability for biasing of a seal face of a first seal ring and to prevent abrasion by making smaller of a friction resistance of a seal face of a seal ring. Also, it aims to make easily fabrication of the mechanical seal device as well as to reduce cost for the mechanical seal by making easily assembling and disassembling.

Means for Solving the Problems

The present invention has been made in order to solve the above mentioned technical problems, and its technical solving problem means is constituted as follows.

A mechanical seal device according to claim 1 of the present invention is that a mechanical seal device for sealing sealed fluid which flows a space between a shaft and an inner circumferential face of a casing body comprising an attachment component made of a rustless material having a mounting face to attach around said inner circumferential face at an outer face of said casing body, a fitting face, a ring shape groove face, a shutoff face formed on an inner peripheral face which encloses said shaft from said mounting face towards an outboard sequentially, and a cooling fluid passage communicating with a cooling chamber in said ring shape groove face through which quenching fluid flowing, a first seal ring made of rustless material having a moving face movably fitting in contact with said fitting face of said attachment component, a passage inner face to form a space between the passage inner face and said shaft, and a seal face provided at a tip end face biased elastically towards an outboard direction by a spring means arranged at a position where said sealed fluid is not contact, a second seal ring made of rustless material having a counter seal face slidable in contact closely with said seal face of said first seal ring, and a circumferential face section at an opposite of said counter seal face to enclose said shaft, a seal collar hermetically fitted with said shaft and made of rustless material having a ring shape and a supporting circumferential face which supports said circumferential section of said second seal ring in closely contact, and a seal ring having a third seal face closely contact with said shutoff face, sandwiched between said supporting circumferential face of said seal collar and said circumferential section of said second seal ring so as to prevent said quenching fluid from flowing out of said cooling chamber.

EFFECTS OF THE INVENTION

In the mechanical seal device of the present invention according to claim 1, the first seal ring and the second seal ring are formed by rustless material such as silicon carbide and carbon, etc. Further, the attachment component and the seal collar are composed by rustless material. Thus, corrosion of the first seal ring, the second seal ring, the attachment component and the seal collar by chemical liquid, etc., can be prevented. Therefore, the mechanical seal device may effectively exert sealing capability. Also, even if the sealed fluid which exists at inner circumferential of the seal face and the counter seal face leaks from a betweenness of a sliding face, the sealed fluid flows through the cooling chamber and is discharged from a drain bore, because there is the cooling chamber at an outer circumferential side of the sliding face. Accordingly, there will be no problem due to leaking chemical liquid, etc. to an outboard.

Further, since the quenching fluid of the cooling chamber exists at an outer circumferential side of a relative sliding of the seal face and the counter seal face, an action of pumping towards an inner diameter direction is not generated between a sliding face, even if the seal face and the counter seal face slide, therefore, it is available to prevent the quenching fluid is mixed with the process fluid. Accordingly, it is available to prevent that the process fluid becomes defective due to the quenching fluid is mixed into the sealed fluid which is the process fluid. Further, even if the sealed fluid leak from a fitting space between a fitting face of the attachment component and a moving face of the first seal ring to an outside, there will be no problem because there is the cooling chamber at the outside, the fluid in the cooling chamber flows to the drain bore and it is available to discharge even if the chemical liquid, etc., is mixed into the quenching fluid. Also, a third seal face of the seal ring slides with a shutoff face of the attachment component made of a resin material, a sliding resistance is small and further abrasion can be prevented. Thus, it is possible to prevent the fluid in the cooling chamber leaks to the outboard.

Also, since the second seal ring is elastically supported at a supporting circumferential face via an attachment base and an O-ring of the seal ring, unreasonable fitting force is not occurred at the second seal ring, and deformation of the counter seal face which deforms by a slight force can be prevented, a seal capability of the counter seal face can be exerted. Also, since the first seal ring fits with a fitting face made of resin material having small friction coefficient, a sliding resistance is small when the first seal ring movably slides, and an advantageous effect to a sealing responsibility with the seal ring and the counter seal face is exerted.

Also, the mechanical seal device has a constitution that all components can be assembled easily to the attachment component which is attached with a casing body. Contrary, when the mechanical seal device is disassembled, it is easily to disassemble as similar to the above. Thus, maintenance and inspection of the mechanical seal device is extremely easy.

EXPLANATION OF REFERENCES

1 Mechanical Seal Device
2 Mechanical Seal
3 Fixed Seal Ring (First Seal Ring)
3A Seal Face
3B Attachment Groove
3C Passage Inner Face
3F Flange Section
3G Guide Groove
3S Moving Face
9 Coil Spring
10 Rotary Seal Ring (Second Seal Ring)
10A Counter Seal Face
10B Circumferential Face Section
10C Fitting Inner Circumferential Face
10D Outer Circumferential Face
20 Seal Ring
20A Attachment Base
20B Seal Lip
20B1 Third Seal Face
24 O-ring
25 O-ring
26 O-ring
30 Attachment Component (Seal Housing)
30A Attachment Face
30B Annular Groove Face
30C Fitting Face
30D Outer Circumferential Face
30G Fixing Groove
30H Spring Seat with Socket
30S Shutoff Face
31 Stud Bolt
34 Gasket
35 Fixing Pin
40 Cooling Fluid Passage
40A Drain Bore
41 Flushing Fluid Passage
50 Seal Collar
50A Supporting Circumferential Face
50C Fixing Circumferential Face
50D Outer Circumferential Face
50F Flange Base
50S Stepped Face
51 Set Plate
51A Fastening Groove
52 Fixing Pin
53 Bolt with Hexagon Socket
55 Fixed Component
55D Divided Face
56 Bolt with Hexagon Socket
57 Screw Section
R1 Inboard Space
R2 Passage Space
R3 Cooling Chamber
O Outboard
I Inboard

THE PREFERRED EMBODIMENTS OF THE INVENTION

Below, a mechanical seal device 1 of an embodiment according to the present invention will be specified precisely on the basis of drawings. Note that, each of drawings specified below are on the basis of design drawings wherein dimensions are accurate.

Figure 1:
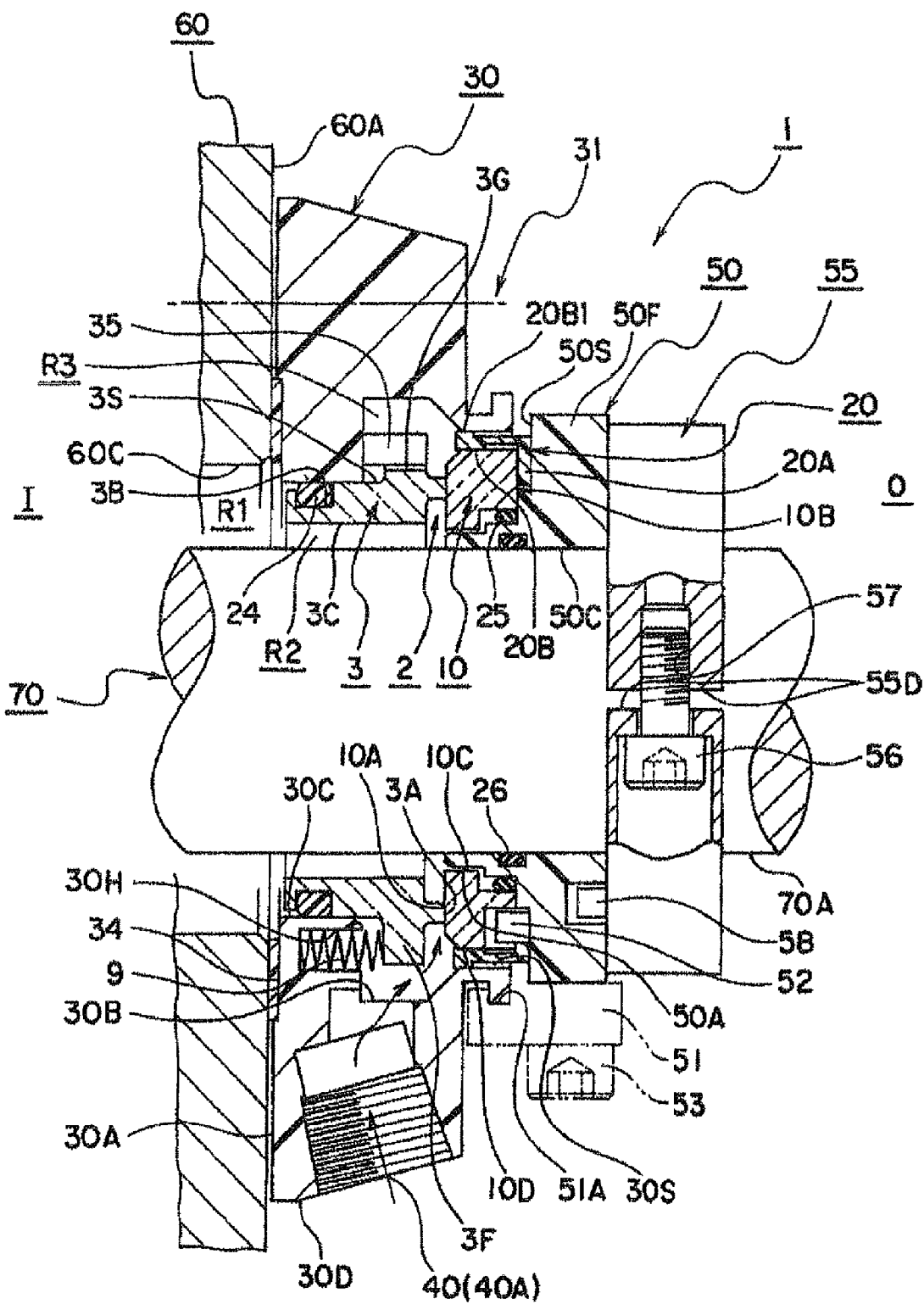
FIG. 1 is a whole cross sectional view wherein a mechanical seal device of the present invention is equipped between a housing and an axis.
Figure 2:
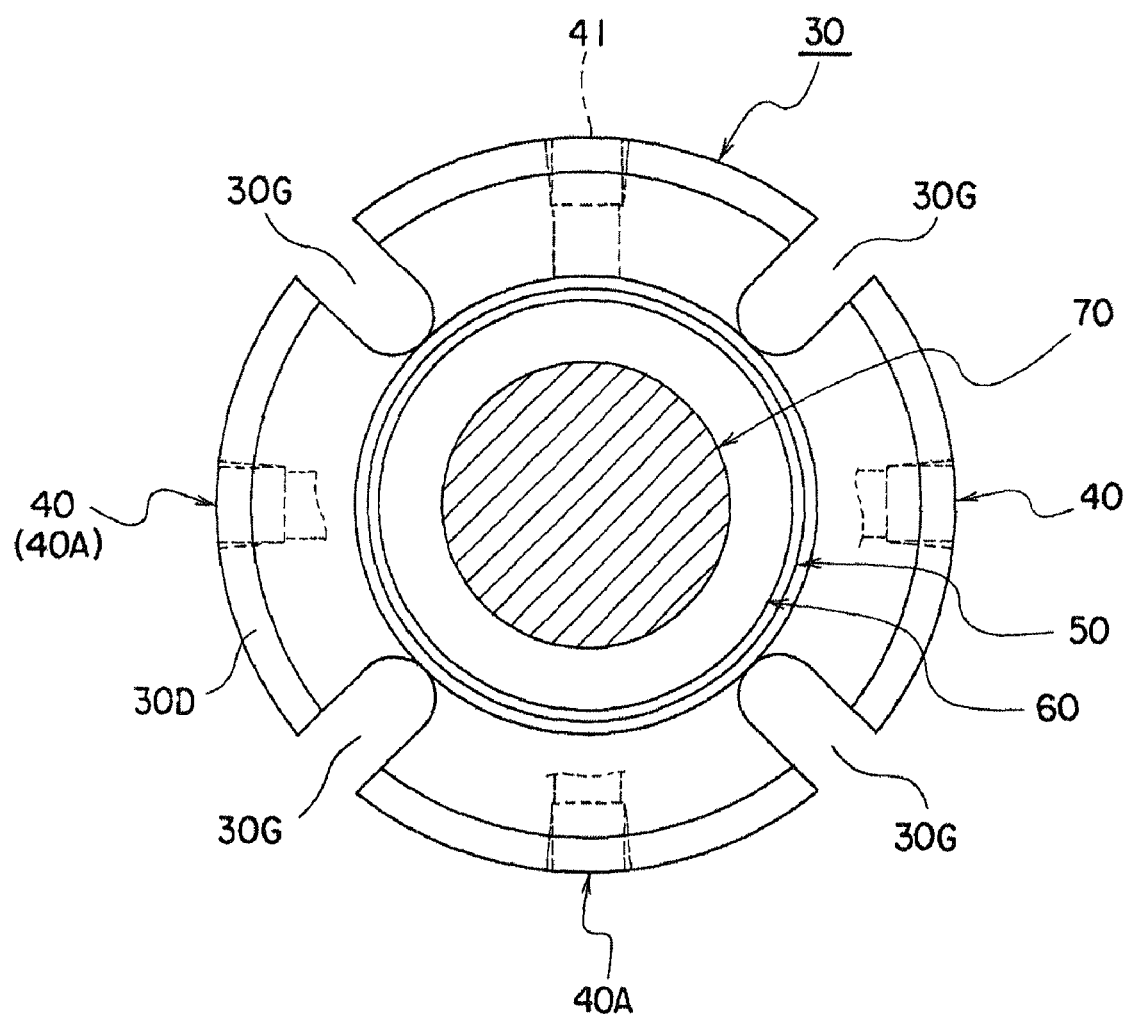
FIG. 2 is a plane view of an axis direction of the mechanical seal device shown in FIG. 1.
Figure 3:
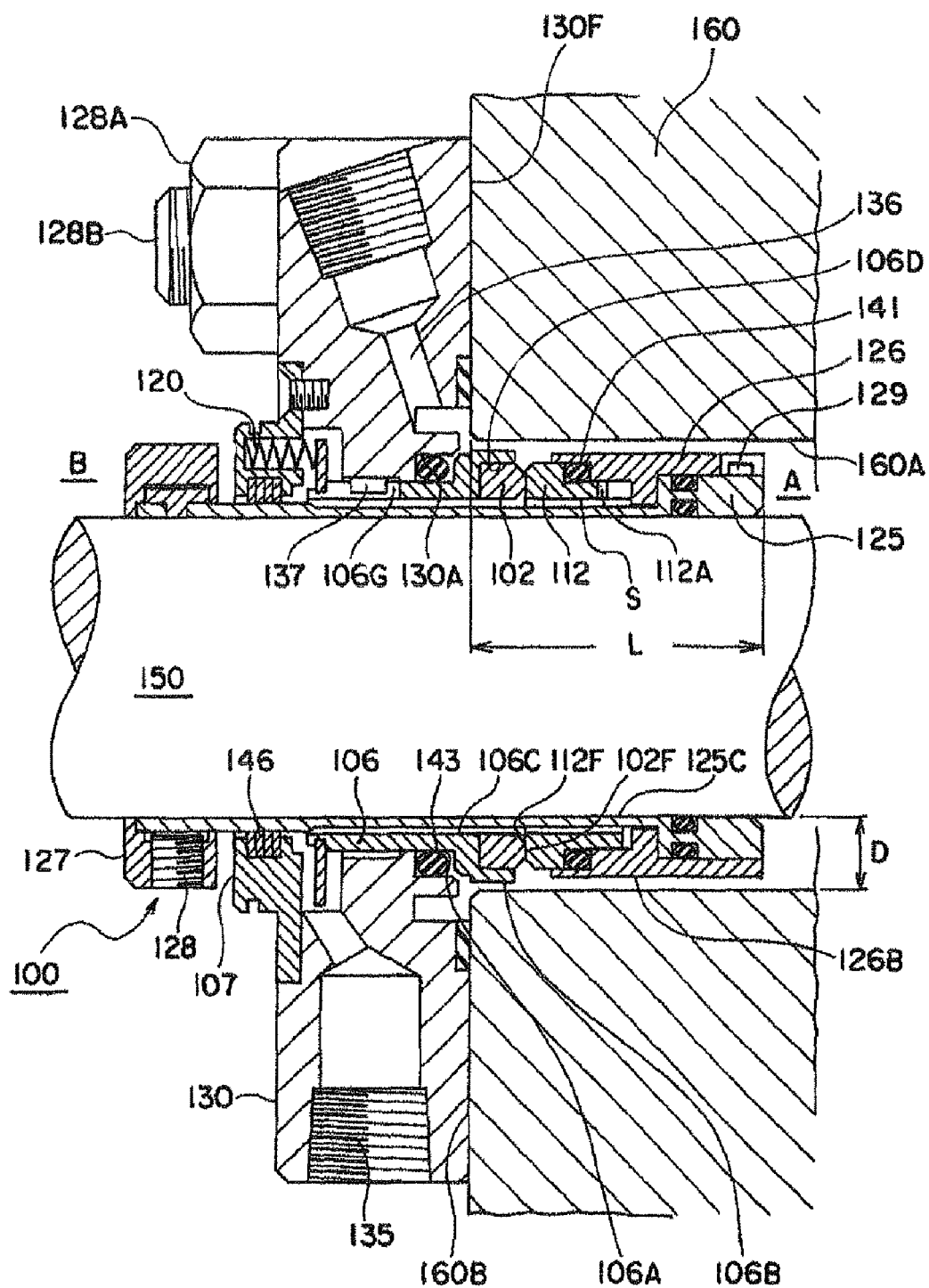
FIG. 3 is a whole cross sectional view of a conventional mechanical seal device which relates with the present invention.

FIG. 1 is a cross sectional view of a mechanical seal device 1 with respect to the present invention which is equipped as a cartridge so as to seal a space R1 between an inner circumferential face 60C of a casing body (also referred as stuffing box) and a rotary shaft 70. Also, FIG. 2 is a plane view of the mechanical seal device 1 of FIG. 1 viewing from an axial direction of the rotary shaft 60. Below, an embodiment 1 of the present invention will be specified with reference to FIG. 1 and FIG. 2.

FIG. 1 shows a mechanical seal device 1 which is a typical configuration of an embodiment of the present invention. As shown in FIG. 1 and FIG. 2, the inner circumferential face 60C of an axial bore is formed at the casing body 60, to which the rotary shaft passes through. Also, an outer face 60A having planar shape is formed on an outside of the casing body 60 around the inner circumferential face 60C. The rotary shaft 60 is arranged by providing an inboard space R1 to the inner circumferential face 60C. Then, as shown in FIG. 1, the mechanical seal device 1 is attached to the outer face 60A so as to seal leakage of sealed fluid, which is process fluid existing in an inboard "I", from the inboard space R1 to an outboard "O". Main component parts to assemble the mechanical seal device 1 are an attachment component (herein after referred as seal housing) 30 attached to the outer face 60A towards the axial direction from the outboard "O", a static seal ring 3 which fits with a fitting face 30C of the seal housing 30 from the outboard "O" to the same direction similarly, a rotary seal ring 10 which slides over a seal collar 50 from the outboard "O" to the same direction similarly, the seal collar 50 which slides over the rotary shaft from the outboard "O" to the same direction similarly, a fixing component which slides over the rotary shaft 60 from the outboard "O" to the same direction similarly so as to fix the seal collar 50. Note that, a seal structure, wherein the fixed seal ring 3 and the rotary seal ring 10 are combined, is called as a mechanical seal 2.

The seal housing 30 attached with the outer face 60A of the casing body 60 forms an annular shape as shown in FIG. 2, and provides fixing groove 30G as four equipartition along a circumferential direction of the outer circumferential face 30D. This seal housing 30 is rustless material. In particular, it is preferable that the seal housing 30 is engineering plastics. For example, it is better to use materials having advantageous resistance (corrosive) against the sealed fluid, such as epoxy resin, unsaturated polyester resin, phenol resin, dicyclopentadiene, further, fiber reinforced thermosetting resin (FRP, FRTP), middle rigid fiber reinforced plastic (tensile elasticity 120 to 175) wherein carbon fiber (CF) and boron fiber (BR) are complexed, high rigid reinforced plastic (tensile elasticity about 300), etc. Namely, a material having good heat resistance, chemical resistance, high strength and formability is suitable. Then, the seal housing 30 is that the fixing groove 30G is inserted to a stud bolt 63 which is provided on the apparatus boy 60 from the axial direction of the outboard "O". Then, the attachment face 30A is joined to the outer face 60A and attached by threading the bolt 60 by a screw nut which is not shown. A gasket 34 having ring shape is provided on a space between the outer face 60A and the attachment face 30A for sealing both faces.

Whole inner circumferential face of the seal housing 30 forms, from the inboard "I" to the outboard "O", the fitting face 30C, an annular groove face 30B and a shutoff face 30S. An inside of this annular groove face 30 is formed at a cooling chamber R3. Also, a cooling fluid passage 40 and a drain port 40A having shapes shown in FIG. 1 are provided on the seal housing 30 so as to pass through the annular groove face 30B. Two or three cooling fluid passages 40 are provided as well as one drain port 40A is provided at around the outer circumferential face 30D. An opening of the cooling fluid passage 40 is a quenching port wherein a thread portion for piping which is available to connect a piping of an outside which is not shown. Then, quenching liquid (including in case of quenching cooling gas) which is supplied from the piping flows into the cooling chamber R3 through the cooling fluid passage 40 to cool the heat generated when the seal face 3A exists in the cooling chamber R3 and the counter seal face 10A are relatively slide, as shown by flowing lines of FIG. 1, by the quenching liquid. Note that, the drain port provided at a bottom portion or a side portion shown in FIG. 2 is for discharging fluid which is supplied from the cooling fluid passage 40. A throttle valve not shown is attached to a thread for piping of the drain port 40A. By this throttle valve, a flow amount which circulates in the cooling chamber R3 can be controlled.

Also, although it is omitted in FIG. 1, one or plurality of flushing fluid passage 41 is/are that an opening portion, to which the thread section for piping available to connect with an outside piping which is not shown, may be provided at a flushing port as well as it may be formed by a port which passes through at a position of the attachment face 30A of the fitting face 30C. Then, the flushing fluid supplied from the outside piping flows the flushing fluid passage 41 and is injected directly to inner circumferential sides of each of seal faces 3A, 10A through a passage space R2. This flushing fluid is injected intermittently to clean circumferential faces such as a passage inner face 3C of the fixed seal ring 3, inner circumferential faces of both seal faces 3A, 10A, etc. which contact with the sealed fluid. There is a case that the flushing fluid is the same as the sealed fluid or fresh water. In any way, fluid is used which do not cause a problem even if mixed into the sealed fluid of the inboard "I". Note that, in case of there is a problem by the flushing fluid is mixed into the process fluid of the inboard "I" or a problem of occurring corrosion at the mechanical seal device 1 by the flushing fluid, there is a case that the flushing fluid passage 41 is not formed as shown in FIG. 1.

A moving face 3S of an outer circumferential of a cylindrical portion of the fixed seal ring (first seal ring) 3 is fitted movable axially at the fitting face 30C of the seal housing 30. An attachment groove 3B for an O-ring to seal between the fitting face 30C and the moving face 3S of the fixed seal ring 3. Although this moving face 3S may be formed that a diameter of both ends of the axial direction of the attachment groove 3B as an identical diameter, as one embodiment, a diameter of the flushing seal fluid 41 side may be formed as slightly small diameter with respect to the attachment groove 3B of the moving face 3S. Then, an O-ring (referred as seal ring too) made of resin material which is one of rustless materials, is attached to the attachment groove 3B. The flushing fluid directly acts to an O-ring 24 from a space between the small diameter moving face 3S and the fitting face 30C so as to clean adhesion tends to adhere on a surface which contacts with the flushing fluid of the O-ring. With respect to materials for the O-ring 24, HNBR, fluorocarbon rubber, nitrile rubber, EPDM, perfluoroelastomer having chemical liquid resistance may be used, other than engineering plastic.

Further, the fixed seal ring 3 forms the seal face 3A at a tip end face which is opposite side to the attachment groove 3B side. Also, at an outer circumferential face which is an intermediate of the axial direction of the fixed seal ring 3, a flange section 3F projected as a ring shape. Guide grooves 3G of equipartition or trisection etc. are formed at the flange section 3F. A fixing pin 35 is engaged to a mounting hole formed at a side face of a ring shape groove face 30B to each of the guide groove 3G. Engaging status of the fixing pin 35 and the guide groove 3G relatively moves to the axial direction and is locked to a circumferential direction. Also, a plurality of spring seats are provided on a side face of the flange portion 3F as equipartition to the circumferential direction. Also, the fixed seal ring 3 is biased to a direction of the counter seal face 10A by seating each of coil springs 9 between the spring seats and a plurality of spring seats with socket provided on the seal housing which is facing. Further, the passage inner face 3C of the fixed seal ring 3 is formed on a passage space R2 which is larger with respect to an outer circumferential face 70A of the rotary shaft 70. Then, a dimension of the passage space R2 is made so that the passage space R2 is not blocked by impurities even if the impurities of chemical liquid (in case of including pulp mixed liquid, fiber, etc.). This fixed seal ring 3 is made of rustless material such as rustless silicon carbide, carbon, and other, such as rigid alloy, ceramic, etc. Also, with respect to the coil spring 9, although spring steel composed as rustless material by plating, etc., may be used, a stainless steel is appropriate. However, the coil spring 9 is provided at a position where does not contact with the sealed fluid.

Also, the seal collar 50 forms a supporting circumferential surface 50A having a stepped shape which is a small diameter at an end towards the axial direction of the rotary seal ring 10 side from the a flange base portion 50F which is a large diameter. An outer circumferential side of the supporting circumferential face 50A is formed on a stepped face 50S. Also, a fixed circumferential face 50C which slides hermetically with the rotary shaft 70 is provided at the seal collar 50. An attachment groove is provided on the fixed circumferential face 50C, and internally comprises an elastic O-ring 26 (referred as seal ring, too) made of resin material, etc., so as to seal the fitting face space. Then, a fitting circumferential face 10 provided on a circumferential face section 10B of the rotary seal ring 10 hermetically seals the supporting circumferential 50A of the seal collar 50 by sandwiching an O-ring 25 (O-ring 25 is provided at a space of stepped face shown in a drawing). Also, a plurality of concave sections which are equipartition toward a circumferential direction formed at an outer circumferential face 10D at the circumferential face section 10B side of the rotary seal ring 10 and a plurality of fixing pins 52 which are fit into a mounting holes of the seal collar 50 are locked each other so as to be a rotary locking. This seal collar 50 is made of engineering plastics of rustless material as similar with the seal housing 30. Specifically, it is better to use materials having advantageous resistance against the sealed fluid, such as epoxy resin, unsaturated polyester resin, phenol resin, dicyclopentadiene, further, fiber reinforced thermosetting resin (FRP, FRTP), middle rigid fiber reinforced plastic (tensile elasticity 120 to 175) wherein carbon fiber (CF) and boron fiber (BR) are complexed, high rigid reinforced plastic (tensile elasticity about 300), etc. Namely, a material having good heat resistance, chemical resistance, high strength and formability is suitable.

Also, the counter seal face 10A is formed at one end of the rotary seal ring 10. This counter seal face 10A is formed slidably with hermetically contact to the seal face 3A of the fixed seal ring 3. Further, the circumferential face section 10B is provided at another end of the rotary seal ring 10. An inner circumferential of the circumferential face section 10B is formed as a fitting inner circumferential face 10C. Also, the outer circumferential face 10D of the rotary seal ring 10 is caused to face with a shutoff face 30S by providing a space. Then, at a space between the stepped face 50S provided on the supporting circumferential face 50A of the seal collar 50 and the circumferential face section 10B of the rotary seal ring 10, an inner circumferential face of one end of an attachment base 20A of a seal ring 20 having L-shape cross sectional view is sandwiched with fitting status at a stepped shape circumferential face of the supporting circumferential face 50A. This seal ring 20 is formed as a seal lip 20B having shape which generates an elastic force to an outside radially by bending cylindrically from the attachment base 20A to an annular groove 30B side. An concave portion which project to an outer circumferential as closely contact elastically with the shutoff face 30S is formed on a free end of the outer circumferential face of the seal lip 20B and a third seal face 20B1 is formed on the concave portion. Note that, it may be that an inner circumferential side of the free end portion is inclined gradually to an outer circumferential direction with thinning and the outer circumferential face closely contacts elastically with the shutoff face 30S, without providing the concave portion at the seal lip 20B. Then, the third seal face 20B1 closely contacts with the shutoff face 30S to seal leakage of the quenching liquid for cooling to the outboard "O". The seal ring 20 may be a resin material having elasticity, HNBR, a material having resistance to the process fluid as similar to the O-ring 24, for example, rubber or a metal material such as brass, rustless steel, etc. Also, the counter seal face 10A of the rotary seal ring has been difficult to maintain flatness by deflecting, when it is slidably fit with the seal collar 50 made of metal, as conventional. However, the flatness of the counter seal face 10A can be maintained if the seal collar is composed by resin material, because unreasonable force does not act when fitting the rotary seal ring 10 slidably. As a result, sealing ability is increased. In particular, the flatness of the counter seal face 10A can be further increased by interposing the attachment base 20A of the seal ring 20 and the O-ring 25 between the rotary seal ring 10 and the seal collar 50. Note that, even if the seal ring 20 is made of metal, it is possible to prevent leakage of the sealed fluid from a betweenness of a contact face of the seal ring 20 because the seal housing 20 and the seal collar 50 which closely contact with the seal ring 20 are made of resin. Also, the rotary seal ring 10 is produced from rustless material such as rustless silicon carbide, carbon, and other rigid alloy, ceramics, etc.

Further, a width of a cooling chamber R3 which is formed by a side face of the annular groove face 308 of the seal housing 30, is formed as largely to both sides of the axial direction to the both seal faces 3A, 10A so as to enlarge a cooling volume. A side face of one end of the annular groove face 30B is formed as largely until close to the attachment groove 3B of the fixed seal ring 3. Further, another side face of the annular groove face 30B is preferably formed widely until covering the counter seal face 10A of the rotary seal ring 10. Then, the quenching liquid supplied from the cooling fluid passage 40 is injected to the both seal face 3A, 10A which slide directly, for washing and cooling, and further washing and cooling the both seal faces 3A, 10A with circulating towards a circumferential direction in the cooling chamber 3. In this manner, the cooling chamber R3 which is formed largely as internally including the most part of the fixed seal ring 3 and the rotary seal ring 10 may exert an effect to cool rapidly by the quenching liquid which is stored in the large cooling chamber R3, even heat is generated to the both seal rings 3, 10 by abrasion according to their relative sliding.

The seal housing 30 and the seal collar 50 as constituted in this manner are positioned and equipped by a set plate shown by a phantom line. This set plate 51 is formed that a plane shape of the axial direction is arcuate, and its cross section is formed as shown by the phantom line. Then, a plurality of the set plates 1 which are provided equipartition at the circumferential face of the seal collar are fixed by bolts with hexagon pocket. Simultaneously, the seal housing 30 and the seal collar 50 are equipped with position setting respectively by fastening a fastening groove 51A formed at the set late 51 to a ring section having flange shape of the seal housing 30. Then, a fixing method for the seal collar 50 is that formed that divided faces 55D, 55D formed by dividing one or two section toward the axial direction of ring shape are respectively coupled. An inner circumferential face of a fixed component 55 is fit to the outer circumferential face 70A of the rotary shaft 70 and joining a tip end face of the fixed component 55 and a tip end face of the seal collar 50 respectively, and to fix the fixed component 55, which is constituted as a ring by fastening spaces of the divided faces 55D of the fixed component 55 by respectively threaded each of the bolts with hexagon hole 56 to respective screw portions 57 of the fixed components 55, to the rotary shaft 70. Simultaneously, the seal collar 50 is maintained to the rotary shaft 70 by the fixed component 55, and the seal collar 50 is fixed by a fixing pin 58 which is anchored to the fixed component 50 without pivotally moving.

Although this fixed component 55 is a rustless steel, it may be other materials, for example, engineering plastics, steel, aluminum, etc. because the component does not contact with chemical liquid, etc. The mechanical seal device 1 as constituted in this manner may exert durable capability without corrosion of components by the chemical liquid as the sealed fluid. Also, the sealing capability can be exerted to the chemical liquid, etc. Further, assembling and disassembling of the mechanical seal device 1 can be operated easily. Thus, the mechanical seal device 1 becomes inexpensive.

Below, with respect to each of inventions according to the present invention, constitutions, functions and effects will be specified.

A mechanical seal device according to a first invention of the present invention wherein a sealing is made of resin material, comprises a seal lip cylindrically formed toward an annular groove side from a ring shaped attachment base which is sandwiched between a supporting circumferential face and a circumferential face section, and a third seal face which closely contacts with a shutoff face at an outer circumferential face of the seal lip.

In the mechanical seal device of the first invention according to the present invention, the seal ring is made of resin material, and is constituted to compose a cylindrical shape from the ring shaped attachment base which is sandwiched between a supporting circumferential face and a circumferential face section to the annular groove, and a seal face at the cylindrical outer circumferential face which closely contacts with a shutoff face. Thus, since the attachment base of the seal ring is equipped with the seal collar which is made of resin material, sealing capability of the attachment base is advantageous due to the resin material. Also, because the third seal face is a constitution which closely contacts with the shutoff face of the attachment base made of resin material, sliding of each resin having small friction coefficient is small resistance, and has an advantageous sealing capability.

A mechanical seal device of a second invention according to the present invention is that a space between a fitting face of an attachment component and a cylindrical portion which fits movably is sealed by an O-ring made of resin material arranged in the space.

Because a mechanical seal device of a second invention according to the present invention wherein a space between a fitting face of an attachment component and a cylindrical portion which fits movably is sealed by an O-ring made of resin material arranged in the space, a sliding resistance of a freely movable first seal ring is small, and a sealing responsibility to a counter seal face of the seal face is advantageous. Further, because the O-ring has an advantage of a liquid resistance to chemical liquid, etc., a durability of the mechanical seal is exerted. Note that, this O-ring is allowed for making resin material having small friction coefficient, because an outside of a fitting space between a fitting face and a cylindrical portion is constituted at a cooling chamber which allows slightly leakage.

Industrial Applicability

As above, the mechanical seal device of the present invention is useful for utilizing to seal sealed fluid such as chemical liquid, pulp mixed liquid. Also, it is useful as a mechanical seal device which is easily assembling and disassembling as well as inexpensive.

The invention claimed is:

1. A mechanical seal device for sealing sealed fluid which flows in a space between a shaft and an inner circumferential face of a casing body comprising:
   an attachment component made of a resin material having a mounting face to attach around said inner circumferential face at an outer face of said casing body, a fitting face, a ring shape groove face, and a shutoff face formed on an inner peripheral face which encloses said shaft in order in a direction from said mounting face towards an outboard direction, and a cooling fluid passage communicating with a cooling chamber in said ring shape groove face through which quenching fluid flows,
   a first seal ring made of rustless material having a moving face movably fitting in contact with said fitting face of said attachment component, a passage inner face to form a space between the passage inner face and said shaft, and a seal face provided at a tip end face biased elastically towards the outboard direction by a spring means arranged at a position where said sealed fluid does not contact,
   a second seal ring made of rustless material having a counter seal face slidably in contact with said seal face of said first seal ring, and a circumferential face section at an opposite side of said counter seal face to enclose said shaft,
   a seal collar hermetically fitted with said shaft and made of a resin material having a ring shape and a supporting circumferential face which supports and contacts said circumferential face section of said second seal ring,
   a fixing component fitted to the rotary shaft on an outboard side than the seal collar in an axial direction and made of a metal material having an inboard side end face in contact with an outboard side end face of the seal collar to support said seal collar,
   a fixing pin anchored to said fixing component for fixing said seal collar to said seal collar without pivotally moving, and
   a seal ring having a third seal face in contact with said shutoff face, sandwiched between said supporting circumferential face of said seal collar and said circumferential face section of said second seal ring so as to prevent said quenching fluid from flowing out of said cooling chamber.

2. The mechanical seal device according to claim 1 wherein said seal ring is made of resin material which comprises a seal lip cylindrically formed toward said annular groove side from a ring shaped attachment base which is sandwiched between said supporting circumferential face and said circumferential face section, and the third seal face is formed at an outer circumferential face of said seal lip.

3. The mechanical seal device according to claim 1 wherein a space between said fitting face of said attachment component and said moving face of said first seal ring is sealed by an O-ring made of engineering plastic, HNBR, fluorocarbon rubber, nitride rubber, or EPDM, perfluoroelastomer, arranged between said attachment component and said first seal ring.

* * * * *